April 20, 1965     M. F. JOHNS     3,178,788
SLIDE FASTENER ELEMENTS
Filed Aug. 7, 1961                                       2 Sheets-Sheet 1
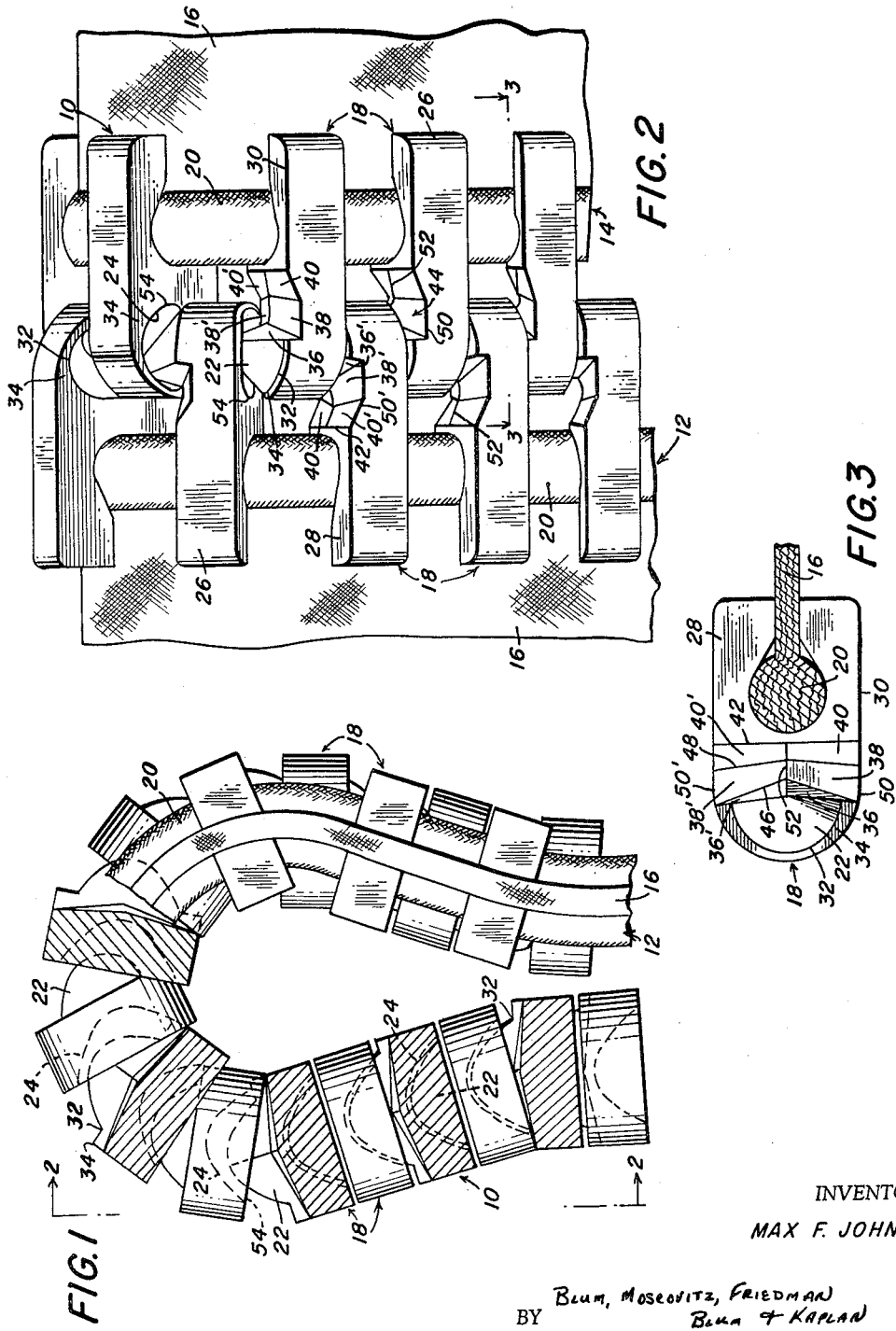
INVENTOR
MAX F. JOHNS
BY Blum, Moscovitz, Friedman Blum & Kaplan
ATTORNEYS

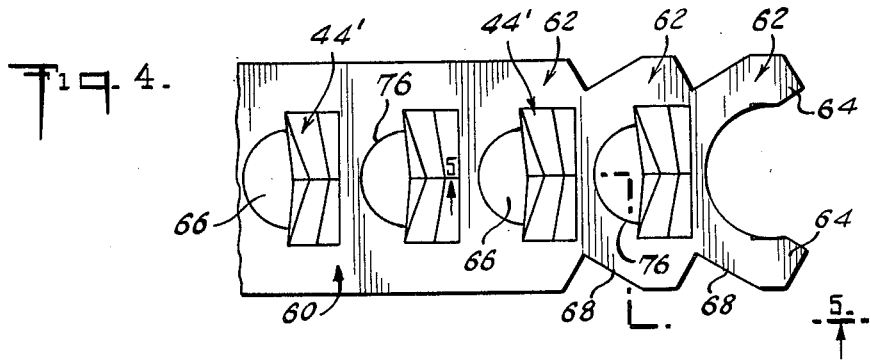
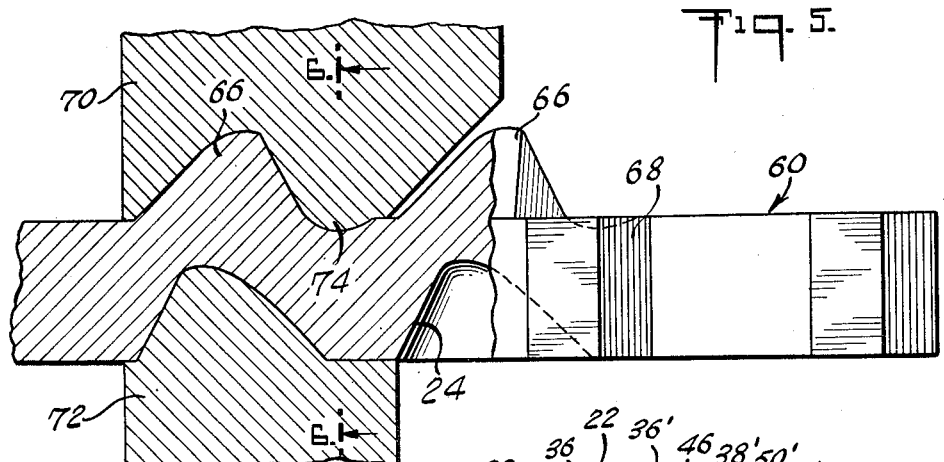
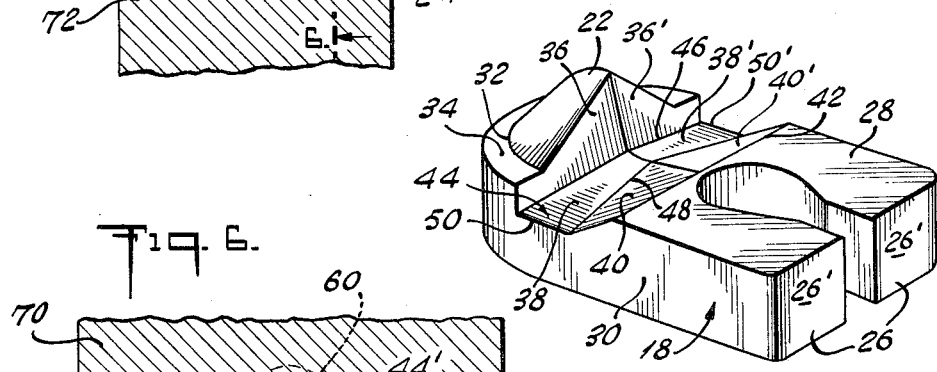
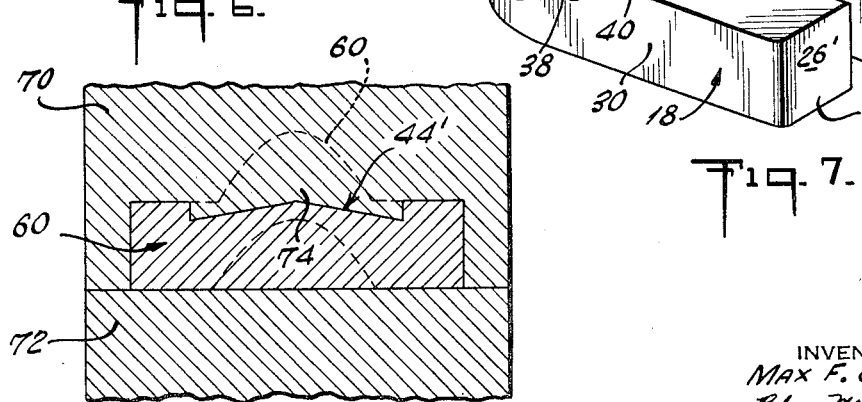

United States Patent Office 3,178,788
Patented Apr. 20, 1965

3,178,788
SLIDE FASTENER ELEMENTS
Max F. Johns, Westfield, N.J., assignor to General Zipper Corp., Long Island City, N.Y., a corporation of New York
Filed Aug. 7, 1961, Ser. No. 129,704
6 Claims. (Cl. 24—205.13)

This invention relates generally to slide fasteners and improved interlocking elements therefor.

One important aim and object of the present invention is the provision of a slide fastener having a greater degree of flexibility than comparable prior art slide fasteners without sacrificing strength. In such prior art fasteners the doubling-over or folding upon itself of the meshed stringers beyond a relatively large radius results in a mutual wedging action between adjacent fastener elements along said radius restricting such folding over to a relatively large radius and consequently restricting the flexibility of such fasteners. If such fastener be folded over forcibly beyond such relatively large radius the mutual wedging action will have a tendency to "pop" or wedge open the fastener. Pursuant to the present invention the fastener has a greater degree of flexibility due to the unique design and construction of the interlocking elements which are formed to provide requisite "relief" to such mutual wedging action between adjacent elements without sacrifice of strength, durability or ease of operation. More particularly, the interlocking elements incorporate a recess adjacent the head to achieve the aforenoted "relief" and consequent fastener flexibility without sacrificing strength. Thus an inherently smaller radius or loop may be formed on doubling-over the fastener without fracturing of the mounting cord at the tape edge or "popping open" of the fastener. This is an important advantage in present day fastener applications as there is a shifting over in the garment industry, for example, to lighter weight garments and fabrics which require greater fastener flexibility coupled with lightweight and without sacrifice of strength, and this desideratum is achieved by the slide fastener of the present invention.

While the slide fastener of the present invention is not limited to any particular size of fastener it is particularly advantageous and eminently suitable in connection with small sizes of fasteners, especially where thickened element legs are used resulting in more metal per unit of fastener length. Pursuant to the present invention such fasteners have the requisite degree of flexibility and strength while obviating or greatly minimizing the "pop-open" problem on fastener foldover of heretofore used slide fasteners.

Another object of the present invention is the provision of a slide fastener of the aforenoted character which may be economically manufactured pursuant to well known and well established mass production techniques. Pursuant to this object of the present invention the slide fastener elements of the present invention may be mass produced at no greater cost than conventional elements using the same basic equipment and procedures utilized for the manufacture of such conventional elements.

Yet another object of the present invention is the provision of a generally improved slide fastener and interlocking elements therefor which are uniquely simple in design and construction, economical to mass produce and which are eminently suitable for lightweight fastener applications requiring a high degree of flexibility coupled with light weight.

Other objects, features and advantages of the present invention will become apparent as the description thereof proceeds when considered in connection with the accompanying illustrative drawings, in which:

FIG. 1 is a fragmentary side elevational view of a slide fastened in accordance with the present invention shown in doubled-over or folded-over condition;

FIG. 2 is a view illustrating the mutual interlocking action between adjacent interlocking elements or scoops taken on the line 2—2 of FIG. 1;

FIG. 3 is a view, partly in section, taken on the line 3—3 of FIG. 2 and illustrates an interlocking element in accordance with the present invention;

FIG. 4 is a plan view of an integral strip of embryo fastener elements in accordance with the present invention;

FIG. 5 is a side elevational view of the strip of embryo fastener elements, on an enlarged scale, taken on the line 5—5 of FIG. 4 in conjunction with a coining die set;

FIG. 6 is a sectional view taken on the line 6—6 of FIG. 5 and showing the coining die set for forming the interlocking elements and reliefs pursuant to the present invention; and FIG. 7 is a perspective view of a finished interlocking element pursuant to the present invention.

Referring to the drawings, and more particularly to FIGS. 1–3 and 7 thereof, there is shown a slide fastener 10 in accordance with the present invention which comprises a pair of stringers 12 and 14 each of which includes a flexible tape 16 having a series of spaced interlockable fastener elements 18 secured to a raised or beaded edge 20 thereof. The tapes 16 may be of any suitable construction for a slide fastener application, such as a woven fabric tape, and the raised edge 20 may be formed in any well known manner such as by the use of a corded edge or by the use of sewn cords thereat. The stringers are meshed and unmeshed in the well known manner by the use of any conventional slider (not shown) which is adapted to be manipulated along the interlocking elements 18. Each of the interlocking elements or scoops 18 comprises a head and pocket 22 and 24, respectively at the inner end thereof spaced from its carrying tape and a pair of jaws 26 at the opposite end thereof in clamping engagement with the raised tape edge 20. As is well known to those skilled in the art, the head 22 of each interlocking element 18 meshes with a companion pocket 24 of the next adjacent element in order to provide for the closure of the slide fastener assembly. The interlocking elements or scoops 18 pursuant to the present invention will now be described in detail.

As previously noted, the interlocking element 18 comprises a head and pocket 22 and 24, respectively at one end thereof and a pair of laterally spaced jaws 26 at the opposite end thereof, the element having opposite surfaces 28 and 30. The head 22 projects upwardly in generally conical fashion from one end of the upper surface 28. The head has a peripheral base edge 32 which defines a peripheral boundary ledge 34 coplanar with surface 28. Thus the base of the head is disposed substantially at a common level with the upper surfaces of the jaws 26. In the illustrated embodiment the head defines a base edge 32 which is spaced from the periphery of the element to define planar ledge 34, it being understood that if desired, the base edge 32 may be coincident with the periphery of said element or may be laterally spaced inwardly thereof otherwise than as shown in the exemplified embodiment.

The head 22 is provided at the side thereof confronting jaws 26 with outwardly inclined lateral surfaces 36, 36' extending transversely to the periphery of the element 18. The lateral surfaces 36, 36' terminate at edge 46 below the ledge 34 and surface 28 for a purpose which will be apparent from the description which follows. Extending laterally from the surfaces 36, 36' toward jaws 26 are base surfaces 38, 38' and connecting surfaces 40, 40', the latter surfaces terminating at a lateral edge 42 extending across the element adjacent the inner end of jaws 26. The lateral edge 42 is disposed substantially in the same plane as ledge 34 and the base edge of head 22. The surfaces 36, 36', 38, 38', and 40, 40' define a recessed area or relief 44 for the next adjacent companion interlocking element of the fastener in the manner to be described in detail hereinafter. It will be noted that the lateral surfaces 36, 36' define the inner boundary walls of head 22 and that such surfaces incline outwardly and steeply towards the jaws 26 to the lateral edge 46 disposed below the level of surfaces 28, 34. The surfaces 40, 40' are gently inclined in the opposite direction from the lateral edge 42 to the lateral edge 48 of the base surfaces 38, 38'. The outer edges 50, 50' of the base surfaces 38, 38' are substantially parallel with the opposite surfaces 28 and 30 of the element, said edges 50, 50' being disposed closer to surface 28 in a plane which is of the order of one-third the distance between said opposite surfaces 28 and 30. The recessed area or relief 44 is substantially symmetrical with respect to the longitudinal medial line 52 of said element and said relief gradually increases in depth from said medial line towards the outer edges of said element. Thus the relief 44 has minimum depth at the medial line 52 and has maximum depth at the outer edges of the relief coincident with the outer edges of said element.

The jaws 26 are initially in a spread apart condition as illustrated in strip 60 of FIG. 4 and when clamped on a mounting tape are formed into substantially parallel disposition as illustrated in FIGS. 3 and 7. The end surfaces 26' of the jaws 26 are substantially squared off and collectively define a longitudinal guide track for the slider.

On the doubling-over of the meshed stringers 12 and 14, as shown in FIGS. 1 and 2, at the fold-over zone, a peripheral edge portion 54 of each pocket 24 will nest in the relief or recessed area 44 of the next adjacent element whereby the fastener may be folded or doubled-over into a relatively small radius at said fold-over zone to thereby improve the flexibility of the fastener assembly. More particularly, in prior art fasteners devoid of the relief 44 characteristic of the interlocking elements of the present invention the folding over of the fastener beyond a relatively large radius results in a mutual wedging action between adjacent fastener elements along such radius at the fold-over zone so as to restrict the folding-over of the fastener to a relatively large radius with consequent restriction of flexibility. Pursuant to the present invention, on the contrary, an inherently smaller radius or loop may be formed on doubling-over the fastener because of the successive nesting of the peripheral edge portion of each pocket of an element of one stringer in the relief of an adjacent element of the other stringer at the fold-over zone as illustrated in FIGS. 1 and 2. Thus the fastener 12 is inherently more flexible and this has been achieved without sacrificing strength or durability making the fastener eminently suitable for application in lightweight garments and for other light fabric applications. Furthermore the slide fastener of the present invention obviates the mutual wedging action at the fold-over zone which has a tendency to "pop" or wedge-open heretofore used fasteners on doubling-over of the same. It will be noted that while the recessed area or relief comprises a series of connected straight surfaces this configuration may be varied as desired and in fact, after fastener use, such relief may take on the appearance of a generally rounded surface.

The step product used in the manufacture of the slide fastener elements or scoops 18 is illustrated in FIGS. 4–6 and said step product comprises a single integral strip 60 of embryo fastener elements 62, each having embryo spaced jaws 64 and an embryo head 66, the head of one element being located between the embryo spread jaws of the next element. The exterior edges of the strip are serrated as indicated at 68 to conform to the outer ends of the embryo spread jaws 64. Each element head has an adjacent recessed area or relief 44' extending below the head laterally to the region of the spread jaws 64, said recessed area or relief 44' corresponding to the relief 44 of the finished formed elements 18. The manner of forming the heads and reliefs and opposite pockets is illustrated in FIGS. 5 and 6 in which a coining die set 70–72 is utilized in the well known manner to form the same, the die 70 being provided with an additional protuberance 74 which is configured complementary to the relief 44' for forming the same during the formation of the heads and pockets of the strip. Save for the provision and formation of the reliefs 44' in the strip 60 the manner of fabricating the interlocking elements and of mounting the same on a tape conforms to standard techniques and procedures. Thus the strip 60 and tape 16 are continuously fed to a so-called "scoop" machine which performs the operations of fabricating the slide fastener elements and attaching the same to the edge of the tape in the desired spaced relation. More particularly, the endmost element of the strip 60 is severed therefrom substantially along a line of severance 76 and substantially simultaneously with such severance the spread jaws 64 are clamped onto the raised edge of the tape to form element 18. It will be noted that the blank of strip 60 is initially of rectangular cross section.

Thus the slide fastener interlockable elements or "scoops" of the present invention may be economically manufactured at high speed pursuant to well known mass production techniques, the coining die-set being modified in the manner illustrated in FIGS. 5 and 6 to provide a complementary relief 44' adjacent each head 66. It will be understood that the specific configuration of the reliefs 44 illustrated and described in detail herein are given by way of example only and that other relief configurations may be utilized in accordance with the principles enunciated above to achieve the aforenoted advantages.

While a specific embodiment of the invention has been shown and described in detail to illustrate the application of the principles of the invention, it will be understood that the invention may be embodied otherwise without departing from such principles.

Having thus described my invention, what I claim and desire to secure by Letters Patent is:

1. An interlocking element for a slide fastener, said element comprising a head and pocket at one end thereof and a pair of spread jaws at the other end thereof, said head being disposed at one side of said element and having a base disposed substantially at a common level with the surfaces of said jaws at said side, said element having a recessed area at said side extending from said head below said base to the region of said jaws to define a relief for a companion interlocking element, said recessed area comprising a series of connected straight surfaces symmetrical with respect to a longitudinal medial line of said element, said head and pocket being disposed at said medial line.

2. An interlocking element for a slide fastener, said element comprising a head and pocket at one end thereof and a pair of spread jaws at the other end thereof, said head being disposed at one side of said element and having a base disposed substantially at a common level with the surfaces of said jaws at said side, said element having a recessed area at said side extending from said head below said base to the region of said jaws to define a relief for a companion interlocking element, said recessed area being symmetrical with respect to a longitudinal medial line of said element and gradually increasing in depth therefrom towards the outer edges of said element, said head and pocket being disposed at said medial line.

3. An interlocking element for a slide fastener, said element having a single head and pocket at one end thereof and a pair of spread jaws at the other end thereof, said head being disposed at one side of said element and having a base disposed substantially at a common level with the surfaces of said jaws at said side, said element having a recessed area at said side extending from said head below said base to the region of said jaws to define a relief for a companion interlocking element, said recessed area being symmetrical with respect to a longitudinal medial line of said element and gradually increasing in depth therefrom towards the outer edges of said element, said recessed area comprising a series of connected straight surfaces symmetrical with respect to a longitudinal medial line of said element.

4. An interlocking element for a slide fastener, said element having a single head and pocket at one end thereof and a pair of spread jaws at the other end thereof, said head being disposed at one side of said element and having an arcuate base edge adjacent an arcuate periphery of said element, said head having outwardly inclined lateral surfaces extending to the periphery of said element at the side thereof confronting said jaws and extending below said base edge, and other surfaces extending from said inclined surfaces towards said jaws and terminating at a lateral edge adjacent said jaws at said one side, said lateral edge and said base edge being substantially coplanar, said inclined and other surfaces defining a relief for a companion interlocking element and being substantially symmetrical with respect to a longitudinal medial line of said element.

5. A slide fastener assembly, comprising a pair of meshed stringers each of which includes a flexible tape having a series of spaced interlockable fastener elements secured to an edge thereof, each of said elements having a single head and pocket at the end thereof spaced from its carrying tape and a pair of jaws at the other end thereof in clamping engagement with the tape edge, said head being disposed at one side of said element and upstanding from a peripheral base adjacent the periphery of said element at said end, said element having a recessed area at said side extending from said head below said base to the region of said jaws, said recessed area being symmetrical with respect to a longitudinal medial line of said element and gradually increasing in depth therefrom towards the outer edges of said element, the doubling-over of the meshed stringers providing, at the foldover zone, for the nesting of a peripheral edge portion of each pocket of an element of one stringer in said recessed area of an adjacent element of the other stringer.

6. A slide fastener assembly, comprising a pair of meshed stringers each of which includes a flexible tape having a series of spaced interlockable fastener elements secured to an edge thereof, each of said elements having a single head and pocket at the end thereof spaced from its carrying tape and a pair of jaws at the other end thereof in clamping engagement with the tape edge, said head being disposed at one side of said element and upstanding from a peripheral base adjacent the periphery of said element at said end, said head having outwardly inclined lateral surfaces extending to the periphery of said element at the side thereof confronting said jaws and extending below said base, and other surfaces towards said jaws and terminating at a lateral edge adjacent said jaws at said one side, said inclined and other surfaces defining a recessed area, the doubling-over of the meshed stringers providing, at the fold-over zone, for the nesting of a peripheral edge portion of each pocket of an element of one stringer in said recessed area of an adjacent element of the other stringer whereby to improve the flexibility of the assembly, said head and pocket being disposed at the longitudinal medial line of said element.

References Cited by the Examiner

UNITED STATES PATENTS

| 1,650,649 | 11/27 | Phillips | 24—205.13 |
| 1,732,787 | 10/29 | Blair | 24—205.13 |
| 1,775,418 | 9/30 | Blair | 24—205.13 |
| 2,221,740 | 11/40 | Ulrich | 24—205.13 |
| 2,322,908 | 6/43 | Poux | 24—205.13 |
| 2,748,440 | 6/56 | Ulrich | 24—205.13 |
| 2,939,192 | 6/60 | Hansen | 24—205.13 |

FOREIGN PATENTS

| 701,294 | 3/31 | France. |
| 613,058 | 5/35 | Germany. |
| 197,258 | 7/38 | Switzerland. |

DONLEY J. STOCKING, *Primary Examiner.*

ABRAHAM G. STONE, *Examiner.*